(12) United States Patent
Hernandez-Marti

(10) Patent No.: US 8,184,014 B2
(45) Date of Patent: May 22, 2012

(54) DRIVER TO TRANSMIT SIGNALS OVER A TRANSMISSION LINE IN A WELL

(75) Inventor: Ramon Hernandez-Marti, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 999 days.

(21) Appl. No.: 12/147,870

(22) Filed: Jun. 27, 2008

(65) Prior Publication Data

US 2009/0321070 A1    Dec. 31, 2009

(51) Int. Cl.
*G01V 11/00* (2006.01)
*E21B 47/12* (2012.01)

(52) U.S. Cl. .................................. 340/855.3
(58) Field of Classification Search ........... 361/1, 107; 340/310.01, 853.1–3, 856; 166/65.1, 250, 166/66; 175/50, 40
See application file for complete search history.

(56) References Cited

U.S. PATENT DOCUMENTS

| | | | |
|---|---|---|---|
| 3,309,657 A | 3/1967 | Rabson | |
| 4,583,093 A * | 4/1986 | Beals | 340/855.3 |
| 4,689,620 A | 8/1987 | Wondrak | |
| 4,828,051 A | 5/1989 | Titchener | |
| 6,031,427 A * | 2/2000 | Black | 331/4 |
| 6,396,415 B1 | 5/2002 | Bulmer | |
| 2004/0041034 A1 | 3/2004 | Kemp | |
| 2007/0167867 A1 | 7/2007 | Wolf | |

FOREIGN PATENT DOCUMENTS

| | | |
|---|---|---|
| EP | 0864951 B1 | 9/1998 |
| WO | 9723058 A1 | 6/1997 |

OTHER PUBLICATIONS

Larson, A Low-Cost, True General-Purpose Telemetry System, Offshore Technology Conference, OTC, 1971, pp. 793-796, XP002551940, Dallas, TX.

* cited by examiner

*Primary Examiner* — David Bagnell
*Assistant Examiner* — Ronald Runyan
(74) *Attorney, Agent, or Firm* — David J Smith

(57) ABSTRACT

An apparatus includes a transmission line for deployment in a well, and a driver to transmit signals over the transmission line. The driver includes a field-effect transistor, and an operational amplifier to control the field-effect transistor, where the operational amplifier and field-effect transistor cooperate to form a voltage-to-current converter.

17 Claims, 3 Drawing Sheets

DRIVER TO TRANSMIT SIGNALS OVER A TRANSMISSION LINE IN A WELL

TECHNICAL FIELD

The invention relates generally to a driver for transmitting signals over a transmission line in a well.

BACKGROUND

Electrical devices can be deployed in a well (used for producing hydrocarbons from a reservoir or for injecting fluids into a reservoir) to perform various downhole tasks, such as well logging, flow control, and so forth. Typically, electrical conductors are run through a cable that extends along the well to the electrical devices to provide power to the electrical devices from an earth surface location. Signaling (commands and/or data) can also be communicated over the cable between earth surface equipment and downhole electrical devices. In some implementations, electrical conductors are run through a wireline, although in other implementations, electrical conductors can be run through other conveyance structures, such as tubing and so forth.

Well logging applications can involve communication of relatively large amounts of data from a downhole well logging tool to earth surface equipment. A challenge associated with communicating signaling over a transmission line in a well is that the transmission line can be very long (sometimes extending to 30,000 feet or more). Repeaters are generally not allowed in the transmission line that is deployed downhole, which further enhances the challenge of accurately communicating signals from a downhole location over a long-length transmission line to earth surface equipment. Moreover, a further challenge of communicating signaling over a transmission line deployed in a well is that the transmission line and the electrical circuits of the downhole tools are exposed to high temperature (200° C. or more). The above communications challenges faced by a well logging tool can prevent reliable, high bandwidth communication of large amounts of data over the transmission line.

To compensate for high temperatures and long-length transmission lines, it may be desirable to generate relatively high-power signals for transmission over the transmission lines. However, transmitting high-power signals over the transmission lines can result in transmitter distortion, which can impair the ability to detect the signals at receivers and can limit available data rates.

SUMMARY

In general, according to and embodiment, an apparatus for use in a well includes a transmission line for deployment in the well, and a driver to transmit signals over the transmission line. The driver includes a field-effect transistor, and an operational amplifier to control the field-effect transistor. The operational amplifier and field-effect transistor cooperate to form a voltage-to-current converter.

Other or alternative features will become apparent from the following description, from the drawings, and from the claims.

DETAILED DESCRIPTION

Figure 1:
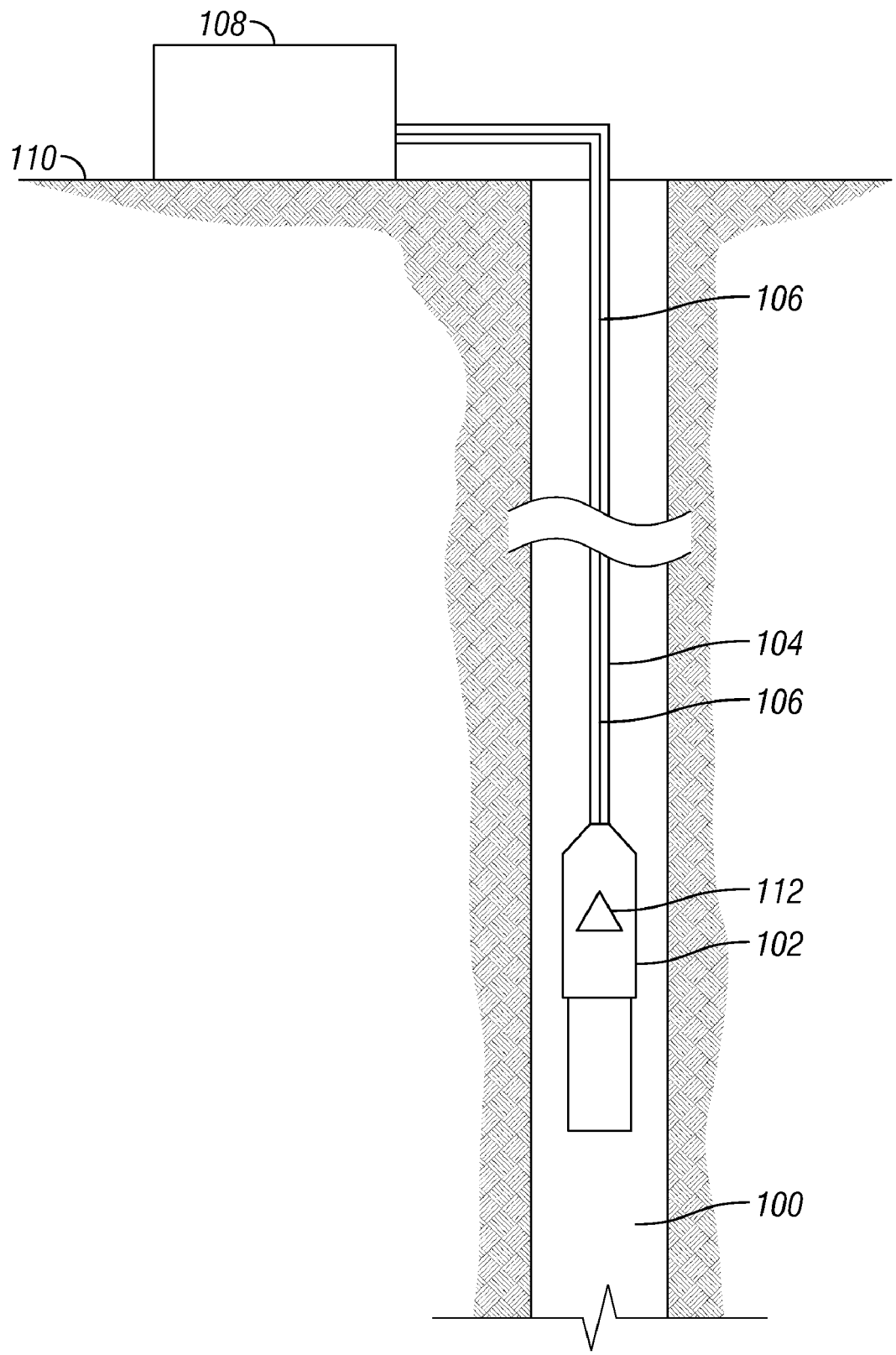
FIG. 1 illustrates an example arrangement that includes earth surface equipment, a transmission line, and a downhole tool, where the arrangement includes a driver according to some embodiments for communicating signals over the transmission line.

In the following description, numerous details are set forth to provide an understanding of the present invention. However, it will be understood by those skilled in the art that the present invention may be practiced without these details and that numerous variations or modifications from the described embodiments are possible.

In accordance with some embodiments, to enable the generation of relatively high-power signals for communication over a transmission line in a well, a driver that is able to achieve low distortion is provided. As used here, the term "transmission line" refers to a collection of one or more electrical conductors that can be deployed in one of various types of conveying structures, such as wireline, tubing (e.g., coiled tubing), and so forth. The driver according to some embodiments can be provided either in a downhole tool or at earth surface equipment, or both.

In one exemplary embodiment, the signals that are generated by the driver can provide power on the order of one $W_{rms}$ (watt root mean square). Given the Gaussian nature of the signals generated by channel efficient modulation schemes like DMT (discrete multi-tone), the driver has to be able to deliver up to 25 $W_{peak}$ without distortion. The power values given above for signals transmitted over a transmission line are provided for purposes of examples only, as signals having other power ratings can be used in other implementations. Moreover, in accordance with some embodiments, the signals generated by a driver according to an embodiment are discrete multi-tone (DMT) signals. DMT refers to a technique of separating a usable frequency range of a signal into multiple frequency bands (or tones) such as, but not limited to, 256 frequency bands (or tones). In other implementations, the driver can produce other types of signals for communication over the transmission line.

To reduce distortion, the driver according to some embodiments is configured to enhance linear operation. The linear operation of the driver is achieved by associating an operational amplifier with a power field-effect transistor (FET) that together form a voltage-to-current converter. The FET is a type of transistor that relies on an electric field to control the shape and thus the conductivity of a channel in a semiconductor material. One example type of an FET is a metal-oxide-semiconductor FET (MOSFET). However, in other implementations, other types of FETs can be used.

The driver further includes a transformer having an output that is connected to the transmission line over which signals provided by the driver are to be communicated. The driver includes two driving circuits that are alternately activated and deactivated, where the two driving circuits provide outputs that are connected to the primary stage of the transformer. Each of the driving circuits includes a corresponding FET and operational amplifier as discussed above. The two driving circuits are arranged in a push-pull manner and could provide ultra-linear operation if operated as a class A driver (both driving for the full signal swing in opposite direction), however, the amount of power that would be dissipated in the MOSFETS is not compatible with reliable operation at high temperature. The two driving circuits alternately drive corresponding primary coils (in the primary stage) of the transformer in opposite phase to produce positive and negative signal strength swings on the secondary winding (in the secondary stage) of the transformer conducting only for their corresponding polarity of the signal and being idle with a small current for the opposed one (as a class AB driver), reducing the power dissipated in the devices to a fraction of the class A driver power, thereby enhancing survivability at high temperature.

Because of the relatively large transconductance of the power FETs, the gate voltage of each of the FETs in the driving circuits can be activated to be a relatively low voltage (e.g., close to the threshold voltage of the FETs) to control a full output current through the primary stage of the transformer. The threshold voltage of the FET refers to the minimum voltage provided to the gate of the FET to turn the FET on. Using precision voltage-to-current inverters in the driving circuits as noted above as active elements in a push-pull output stage simplifies bias stabilization with temperature. The low voltage swing required at the gate of the MOSFET means that, with careful selection of operational amplifiers, slew rate limitations can be reduced or eliminated.

FIG. 1 illustrates an example arrangement in which a downhole tool 102 is deployed in a well 100. The downhole tool 102 can be, for example, a well logging tool that collects measurements regarding various characteristics in a well and/or a surrounding reservoir. The characteristics can include temperature, pressure, type of fluid, reservoir conductivity or resistivity, and so forth.

The logging tool 102 is conveyed in the well 100 by a conveyance structure 104. The conveyance structure 104 can be, for example, a wireline or other type of conveyance structure. The conveyance structure 104 includes a transmission line 106 to enable power to be provided to the downhole tool 102 from surface equipment 108 located at an earth surface location 110. Also, signaling (including commands and/or data) can be communicated over the transmission line 106 in both directions between the surface equipment 108 and the downhole tool 102.

As depicted in FIG. 1, the downhole tool 102 includes a driver 112 according to some embodiments. The driver 112 is able to transmit signaling over the transmission line 106 for receipt by the surface equipment 108. Although not depicted, note that the surface equipment 108 can also include a driver according to some embodiments to transmit signaling to the downhole tool 102.

Figure 2:
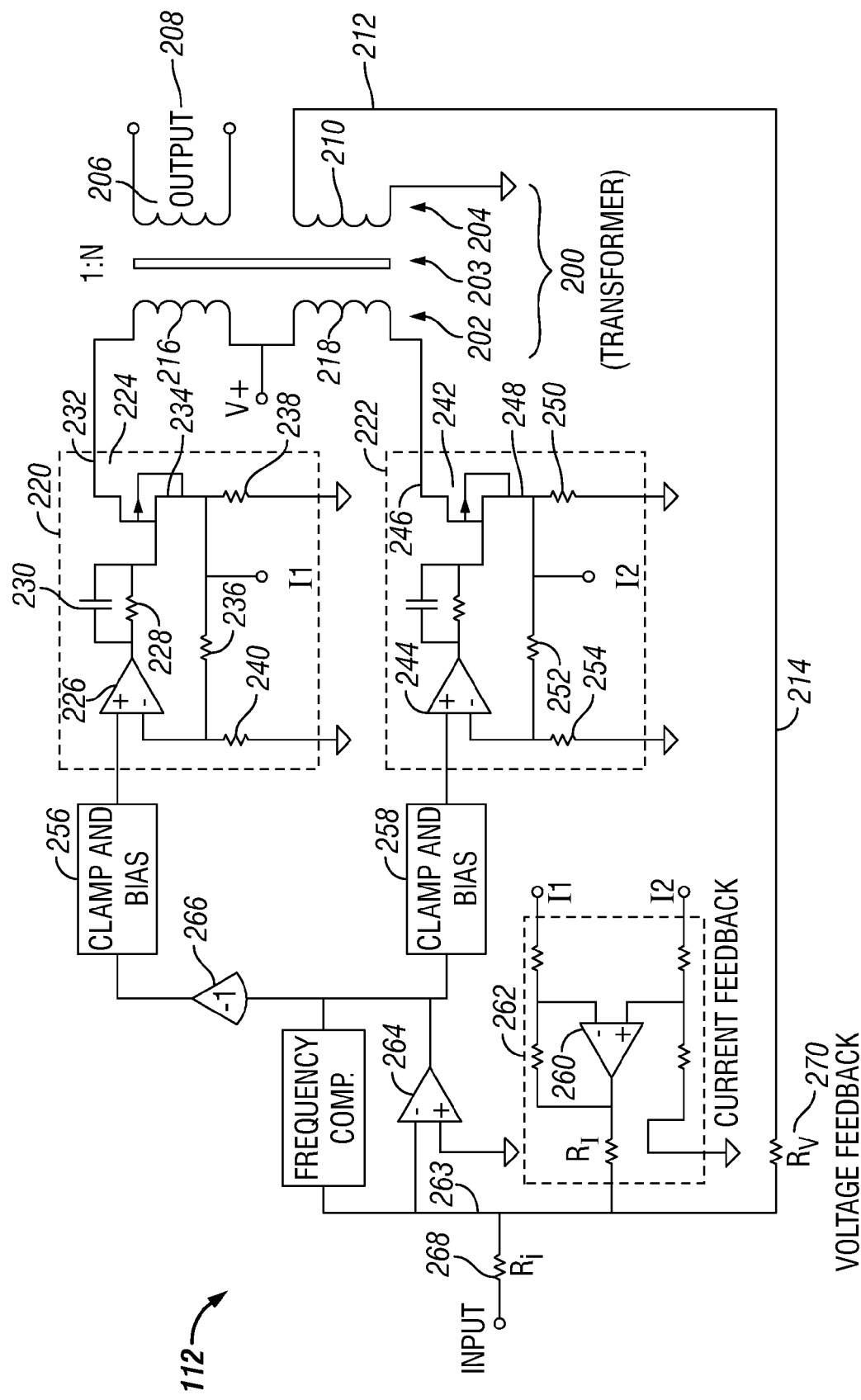
FIG. 2 is a schematic circuit diagram of a driver according to an embodiment.

FIG. 2 shows in greater detail components of an exemplary driver 112 according to an embodiment. The driver 112 includes a transformer 200 that has a primary stage 202 and a secondary stage 204. A secondary coil 206 in the secondary stage 204 of the transformer 200 provides an output 208 that is connected to the transmission line 106 (FIG. 1). Note that in some implementations several secondary coils may be used to drive transmission modes supported over a plurality of conductors in the logging cable. In such implementations, the output of the transformer is driven by multiple secondary coils. Note also that the secondary stage 204 has another secondary coil 210 that produces an output voltage 212 (that is equal to the voltage provided at the output 208 by the secondary coil 206), to provide voltage feedback through a path 214.

The primary stage 202 of the transformer 200 includes primary coils 216 and 218. The primary stage 202 is also referred to as the input of the transformer 200. The primary coil 216 is driven by a first driving circuit 220, while the primary coil 218 is driven by a second driving circuit 222. The first and second driving circuits 220 and 222 are generally identical to each other, and as noted above, are configured in a push-pull arrangement to alternately drive corresponding primary coils 216 and 218 of the transformer 200.

The first driving circuit 220 includes a MOSFET 224 that has a gate coupled to an output of an operational amplifier 226 through a resistor 228 and capacitor 230 arranged in parallel.

The drain 232 of the MOSFET 224 is connected to one end of the primary coil 216, while the source 234 of the MOSFET 224 is connected to a node in a resistor network including resistors 236, 238, and 240. Note that the terms "drain" and "source" of a FET are used interchangeably.

The MOSFET 224 source current produces a voltage drop across the source resistor 238 that results from voltage division provided by the resistor network including resistors 236, 238, and 240. The resistor network forms a local feedback loop that applies a fraction of the source voltage (voltage at the source 234 of the MOSFET) to the inverting input (−input) of the operational amplifier 226. The voltage applied to the non-inverting input (+ input) of the operational amplifier 226 is matched by the voltage at the inverting (−) input, which defines a relation between the voltage at the non-inverting (+) input of the operational amplifier 226 and the MOSFET current controlled by the resistance values of resistors 236, 238, and 240.

The value of the source resistor 238 is selected to produce a voltage drop between one and two volts at the peak current of the MOSFET 224, which constitutes the bulk of the voltage variation at the output of the operational amplifier 226 given the relatively high transconductance of the MOSFET 224. This limits the voltage excursion of the operational amplifier 226 far from its supply rails, in a region without slew rate limitations. The operational amplifier 226 is able to drive relatively large capacitive loads, which is aided by the parallel RC network (including the capacitor 230 and resistor 228) between the output of the operational amplifier 226 and the gate of the MOSFET 224, and the voltage divider including resistors 236, 238, and 240.

Like the first driving circuit 220, the second driving circuit 222 includes a MOSFET 242 and an operational amplifier 244 that has its output coupled through an RC network to the gate of the MOSFET 242. The drain 246 of the MOSFET is connected to one end of the primary coil 218, and the source 248 of the MOSFET 242 is connected to a resistor divider network including resistors 250, 252, and 254. The local feedback loop provided by the resistor network (250, 252, 254) is provided to the inverting (−) input of the operational amplifier 244.

For positive voltages applied to the non-inverting (+) input of each of operational amplifiers 226 and 244, the MOSFET/operational amplifier combination behaves like a linear voltage-to-current converter. The transconductance of such a voltage-to-current converter is fixed by the values of the resistor network resistance values. The arrangement of the driving circuits of FIG. 2 provides for relatively low distortion.

The second driving circuit 222 is driven in a phase that is opposite to the first driving circuit 220. The currents of the two driving circuits are coupled to opposite ends of the transformer primary coils 216 and 218 that subtract the resulting magnetic fluxes in the transformer core 203 to produce a push-pull drive action.

Note that the MOSFET/operational amplifier combinations can sink current but not source current. To avoid high power dissipation as well as to prevent the driving circuits 220 and 222 from operating non-linearly, clamp circuits 256 and 258 are provided at the non-inverting (+) inputs of the operational amplifiers 226 and 244, respectively. Each clamp circuit 256, 258 prevents the non-inverting (+) input of the corresponding operational amplifier 226, 244 from going negative, which maintains the corresponding MOSFET 224, 242 biased at the verge of conduction (i.e., the gate voltage of the corresponding MOSFET is at or slightly above the threshold voltage of the MOSFET). A small offset is added to have a small band of simultaneous conduction of the two MOSFET/operational amplifier combinations to avoid ambiguities around zero and to prevent cross-over distortion. This simultaneous conduction through the MOSFETs effectively doubles the gain of the output stage in a narrow band around zero volts, and can increase third and fifth components of harmonic distortion. However, a global negative feedback can be used to reduce these effects.

Feedback is provided in the driver 112 through a high-gain operational amplifier. In some embodiments, two feedback loops are used. A current loop is provided by tying the sources 234 and 248 of the first and second driving circuits 220 and 222, respectively, to the inverting and non-inverting inputs, respectively, of an operational amplifier 260. This provides current feedbacks (I1 and I2) from the sources 234 and 248 of the MOSFETs 224 and 242 respectively.

The operational amplifier 260 is part of a current feedback circuit 262 that produces an output that is connected to a node 263 that is in turn connected to the inverting (−) input of another operational amplifier 264. The non-inverting (+) input of the operational amplifier 264 is tied to ground. In the current feedback circuit 262, the output of the operational amplifier 260 is passed through resistor $R_1$ to the node 263. The output of the operational amplifier 264 is connected to the input of the clamp circuit 258, and an inverse of the output of the operational amplifier 264 (as produced by an inverting circuit 266) is provided to the input of the clamp circuit 256.

An input to the driver 112 is provided through an input resistor ($R_i$) 268, which is in turn connected to the node 263 that is connected to the inverting (−) input of the operational amplifier 264.

A further feedback in the driver 112 is the voltage feedback provided over path 214. This voltage feedback includes the output voltage 212 (of the output coil 210 in the secondary stage 204 of the transformer 200) that is provided through a feedback resistor ($R_v$) 270 to the node 263 that is connected to the inverting (−) input of the operational amplifier 264.

With reference to FIG. 2, resistors $R_i$, $R_v$, and $R_f$ set the gain and the output impedance. Output voltage ($V_o$) and current ($I_o$) are related to the input voltage ($v_i$) as follows:

$$\frac{v_i}{R_i} + \frac{V_o}{R_V} + \frac{NI_o}{R_I} = 0 \Rightarrow V_o + \frac{NR_V}{R_I}I_o = -\frac{R_V}{R_i}v_i,$$

where the positive output current $I_o$ is leaving the driver 112 towards the load and N is the transformer turns ratio. It can easily be seen that if $R_I/NR_v=50$, the driver behaves as if it has a 50 Ω resistance in series with its output; however, there is no reduction in the output dynamic range or power loss as would have been the case if a physical resistor had been used. Further, if $v_i=0$, then $V_o=-50\ I_o$, i.e., the driver 112 presents an output voltage of 50V for an input current of 1 A (entering the driver), and thus behaves like a 50 Ω terminating resistor to allow full duplex transmission on the transmission line.

The driver 112 provides relatively outstanding low harmonic and MTPR (multitone power ratio), which is achieved by the association of a power MOSFET and an operational amplifier wired as a unipolar transconductance amplifier and used as the active elements in a push-pull topology around an output transformer.

Figure 3:
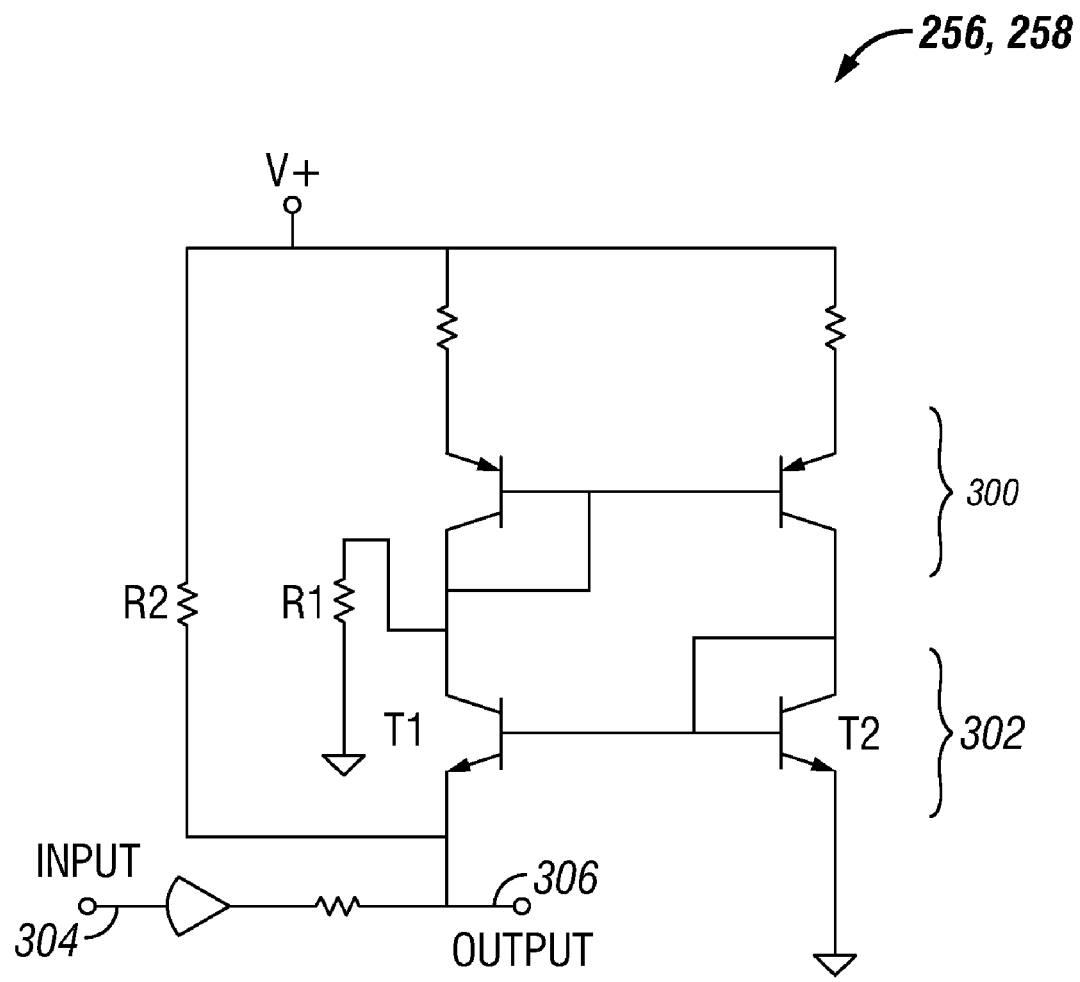
FIG. 3 is a schematic circuit diagram of a clamp circuit according to an embodiment for use in the driver of FIG. 2.

FIG. 3 shows and example clamp circuit 256 or 258 used in the driver 112 of FIG. 2. The clamping circuit includes a PNP current mirror 300 (including two PNP transistors) provided above an NPN matched pair 302 (including NPN transistors T1 and T2) wired as a voltage clamp. Note that a simple NPN matched transistor pair (such as transistor pair 302) will only keep the clamping voltage equal to the forced emitter voltage when the currents on the two transistors (T1 and T2) of the transistor pair 302 are equal. To force equal currents through transistors T1 and T2, the PNP current mirror 300 effectively makes the current identical over the clamping NPN transistor pair 302. However, the PNP current mirror 300 introduces a switching problem as a PNP transistor is slower to turn on than an NPN transistor.

When the input voltage (304) is negative, all transistors (in the PNP current mirror 300 and NPN transistor pair 302) are in the active region. However, when the input voltage (304) crosses above zero, transistor T1 cuts off, which causes the current mirror 302 to turn off. As a result, transistor T2 also turns off. When the input voltage (304) swings negative again, transistor T1 starts to conduct, but the PNP mirror 300 cannot turn on fast, which may keep transistor T2 off and allow the output voltage (306) to go below zero. To resolve this issue, a resistor R1 is used to provide a small current to bias the PNP pair when transistor T1 is off. The current introduced by the resistor R1 keeps the other three transistors at the verge of conduction, such that the other transistors can turn on quickly.

Another resistor R2 is provided in the clamp circuit 256 or 258 of FIG. 3 to add a DC offset to the input voltage (304) to provide class AB operation that masks a dead band caused by bias current through transistor T2.

By using a driver according to some embodiments that include various components discussed above, relatively high power signals can be communicated over a transmission line in a high temperature wellbore environment. The driver is operated generally in the linear range to avoid signal distortion.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. An apparatus comprising:
   a transmission line for deployment in a well; and
   a driver to transmit signals over the transmission line, the driver comprising:
   a field-effect transistor; and
   an operational amplifier to control the field-effect transistor, wherein the operational amplifier and field-effect transistor cooperate to form a voltage-to-current converter, wherein the driver further comprises a current feedback circuit that feeds back current based on a source current of the field-effect transistor to a node coupled to an input of the driver.

2. The apparatus of claim 1, wherein the driver further comprises a transformer having an output connected to the transmission line, and wherein the field-effect transistor is connected to an input of the transformer.

3. The apparatus of claim 2, wherein the driver further comprises:
   a first driving circuit including the field-effect transistor and the operational amplifier; and
   a second driving circuit including a second field-effect transistor and a second operational amplifier to control the second field-effect transistor, wherein the second operational amplifier and second field-effect transistor cooperate to form a second voltage-to-current converter, wherein the first driving circuit and second driving circuit are alternately activated to alternately drive the input of the transformer.

4. The apparatus of claim 3, wherein the first driving circuit and second driving circuit are alternately activated to provide a push-pull arrangement.

5. The apparatus of claim 3, wherein the transformer has two input coils, and wherein the first and second driving circuits alternately drive the corresponding input coils of the transformer in opposite phase.

6. The apparatus of claim 1, wherein the driver further comprises a resistor network providing a feedback from a source of the field-effect transistor to an inverting input of the operational amplifier.

7. The apparatus of claim 6, wherein the driver further comprises a clamp and bias circuit connected to a non-inverting input of the operational amplifier to prevent a voltage at the non-inverting input from going negative.

8. The apparatus of claim 7, wherein the clamp and bias circuit comprises a PNP current mirror and an NPN matched pair of NPN transistors, wherein the PNP current mirror forces equal currents through transistors of the NPN matched pair.

9. The apparatus of claim 1, wherein the driver further comprises an operational amplifier having an inverting input connected to the node, and wherein the operational amplifier has a non-inverting input connected to ground.

10. The apparatus of claim 1, wherein the driver further comprises:
a transformer having an input connected to the field-effect transistor, and an output connected to the transmission line; and
a voltage feedback circuit to feed back an output voltage at a secondary coil of the transformer to the node.

11. The apparatus of claim 10, wherein the voltage feedback circuit comprises a resistor connected between the output voltage and the node.

12. A driver for communicating signaling over a transmission line in a well, comprising:
a transformer having a secondary coil for connection to the transmission line;
a field-effect transistor having a drain connected to a primary coil of the transformer;
an operational amplifier having an output to drive a gate of the field-effect transistor;
a resistor network to provide feedback from a source of the field-effect transistor to a first input of the operational amplifier;
a first driving circuit including the field-effect transistor, operational amplifier, and resistor network; and
a second driving circuit including a second field-effect transistor having a drain connected to a second primary coil of the transformer, a second operational amplifier, and second resistor network to provide feedback from a source of the second field-effect transistor to a first input of the second operational amplifier.

13. The driver of claim 12, further comprising a clamp circuit having an output connected to a second input of the operational amplifier, wherein the clamp circuit prevents the second input from going negative.

14. The driver of claim 12, wherein the first and second driving circuits alternately drive the corresponding primary coils of the transformer in opposite phase.

15. The driver of claim 14, further comprising a current feedback circuit to feed back currents from the first and second driving circuits to a node coupled to an input of the driver.

16. The driver of claim 15, further comprising a voltage feedback circuit to feed back an output voltage of the transformer to the node.

17. A method of driving a transmission line deployed in a well, comprising:
providing a transformer that has an output connected to the transmission line;
providing an operational amplifier and field-effect transistor configured as a voltage-to-current converter, wherein a drain of the field-effect transistor is connected to an input of the transformer; and
feeding back an output voltage of the transformer and a current produced from the field-effect transistor to another operational amplifier that provides input to the operational amplifier.

* * * * *